US012336017B2

(12) United States Patent
Cui et al.

(10) Patent No.: US 12,336,017 B2
(45) Date of Patent: Jun. 17, 2025

(54) CHANNEL STATE INFORMATION REFERENCE SIGNAL (CSI-RS) BASED CONTENTION FREE RANDOM ACCESS (CFRA) IN RADIO RESOURCE MANAGEMENT (RRM)

(71) Applicant: Apple Inc., Cupertino, CA (US)

(72) Inventors: Jie Cui, San Jose, CA (US); Fangli Xu, Beijing (CN); Yushu Zhang, Beijing (CN); Yang Tang, San Jose, CA (US); Qiming Li, Beijing (CN); Manasa Raghavan, Sunnyvale, CA (US); Xiang Chen, Campbell, CA (US); Huaning Niu, San Jose, CA (US); Hong He, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/775,931

(22) PCT Filed: Aug. 5, 2021

(86) PCT No.: PCT/CN2021/111002
§ 371 (c)(1),
(2) Date: May 11, 2022

(87) PCT Pub. No.: WO2023/010448
PCT Pub. Date: Feb. 9, 2023

(65) Prior Publication Data
US 2024/0155696 A1    May 9, 2024

(51) Int. Cl.
*H04W 52/02* (2009.01)
*H04W 36/00* (2009.01)
(Continued)

(52) U.S. Cl.
CPC .  *H04W 74/0838* (2024.01); *H04W 36/00695* (2023.05); *H04W 36/249* (2023.05); *H04W 36/00698* (2023.05)

(58) Field of Classification Search
None
See application file for complete search history.

(56) References Cited

U.S. PATENT DOCUMENTS 10,575,269 B2 *   2/2020   Chae ................... H04W 72/30
10,602,549 B2 *   3/2020   Tsai .................... H04W 76/34
(Continued)

FOREIGN PATENT DOCUMENTS

CN      112738906 A     4/2021
EP      3 820 055 A1   12/2021
WO      2021028046 A1   2/2020

OTHER PUBLICATIONS

3rd Generation Partnership Project; Technical Specification Group Radio Access Network; NR; Requirements for support of radio resource management; (Release 16); 3GPP TS 38.133 V16.8.0 (Jun. 2021); http://www.3gpp.org; Part 1; 1390 pages.
(Continued)

*Primary Examiner* — Sithu Ko
(74) *Attorney, Agent, or Firm* — Eschweiler & Potashnik, LLC; Matthew W Glause

(57) ABSTRACT

A user equipment (UE), baseband processor or other network device (e.g., base station, next generation NodeB, etc.) can operate to configure a hand over (HO) or a primary secondary cell (PSCell) addition based on a channel state information reference signal (CSI-RS) based contention free random access (CFRA) procedure. A CSI-RS rough timing of a CSI-RS position can be determined based on a synchronization signal block (SSB) associated with a CSI-RS or a serving cell timing. A CFRA transmit timing can be determined based on the CSI-RS rough timing or a CSI-RS
(Continued)

fine timing that is derived from a timing and frequency (T/F) tracking operation on the CSI-RS. Reference signal receive power (RSRP) measurement(s) can be made on the CSI-RS for performing the CSI-RS based CFRA procedure with transmissions according to the CSI-RS transmit timing of the CSI-RS that satisfies an RSRP threshold.

14 Claims, 10 Drawing Sheets

(51) Int. Cl.
*H04W 36/24* (2009.01)
*H04W 74/0838* (2024.01)

(56) References Cited

U.S. PATENT DOCUMENTS

| | | | | |
|---|---|---|---|---|
| 10,917,825 | B2* | 2/2021 | Peisa | H04W 36/304 |
| 10,939,442 | B2 | 3/2021 | Lin | |
| 11,533,692 | B2* | 12/2022 | Luo | H04W 76/11 |
| 11,606,819 | B2* | 3/2023 | Islam | H04L 5/0053 |
| 12,137,476 | B2* | 11/2024 | Li | H04W 74/0833 |
| 12,207,296 | B2* | 1/2025 | Wei | H04W 74/04 |
| 2018/0262313 | A1* | 9/2018 | Nam | H04L 5/0044 |
| 2019/0166513 | A1* | 5/2019 | Lin | H04W 24/10 |
| 2020/0146068 | A1 | 5/2020 | Islam et al. | |
| 2021/0068160 | A1* | 3/2021 | Takahashi | H04W 74/0833 |
| 2021/0105828 | A1 | 4/2021 | Agiwal et al. | |
| 2021/0235397 | A1 | 7/2021 | Zhang et al. | |
| 2023/0379769 | A1* | 11/2023 | Ramachandra | H04W 74/0833 |

OTHER PUBLICATIONS

3rd Generation Partnership Project; Technical Specification Group Radio Access Network; NR; Requirements for support of radio resource management; (Release 16); 3GPP TS 38.133 V16.8.0 (Jun. 2021); http://www.3gpp.org; Part 2; 1812 pages.

3rd Generation Partnership Project; Technical Specification Group Radio Access Network; NR; Physical layer procedures for control (Release 16); 3GPP TS 38.213 V16.6.0 (Jun. 2021).

3rd Generation Partnership Project; Technical Specification Group Radio Access Network; NR; Radio Resource Control (RRC) protocol specification (Release 16); 3GPP TS 38.331 V16.5.0 (Jun. 2021).

PCT Search Report dated Apr. 24, 2022 in connection with PCT Application No. PCT/CN2021/111002.

PCT Written Opinion dated Apr. 24, 2022 in connection with PCT Application No. PCT/CN2021/111002.

OPPO Discussion on RACH-based small data transmission; 3GPP TSG-RAN WG2 #112-e; R2-2009014; Nov. 30, 2020.

European Extended Search Report dated Feb. 2, 2025 in connection with Application No. 21952336.2.

Nokia; Initial discussion on CSI-RS based measurement; 3GPP TSG-RAN WG4 AH 1801; R4-1800360; Jan. 22, 2018.

Spreadtrum Communications; Remaining issues on initial access signals; 3GPP TSG RAN WG1 #101; R1-2004000; May 25, 2020.

* cited by examiner

CHANNEL STATE INFORMATION REFERENCE SIGNAL (CSI-RS) BASED CONTENTION FREE RANDOM ACCESS (CFRA) IN RADIO RESOURCE MANAGEMENT (RRM)

FIELD

The present disclosure relates to wireless technology including channel state information reference signal (CSI-RS) based contention free random access (CFRA) in radio resource management (RRM).

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
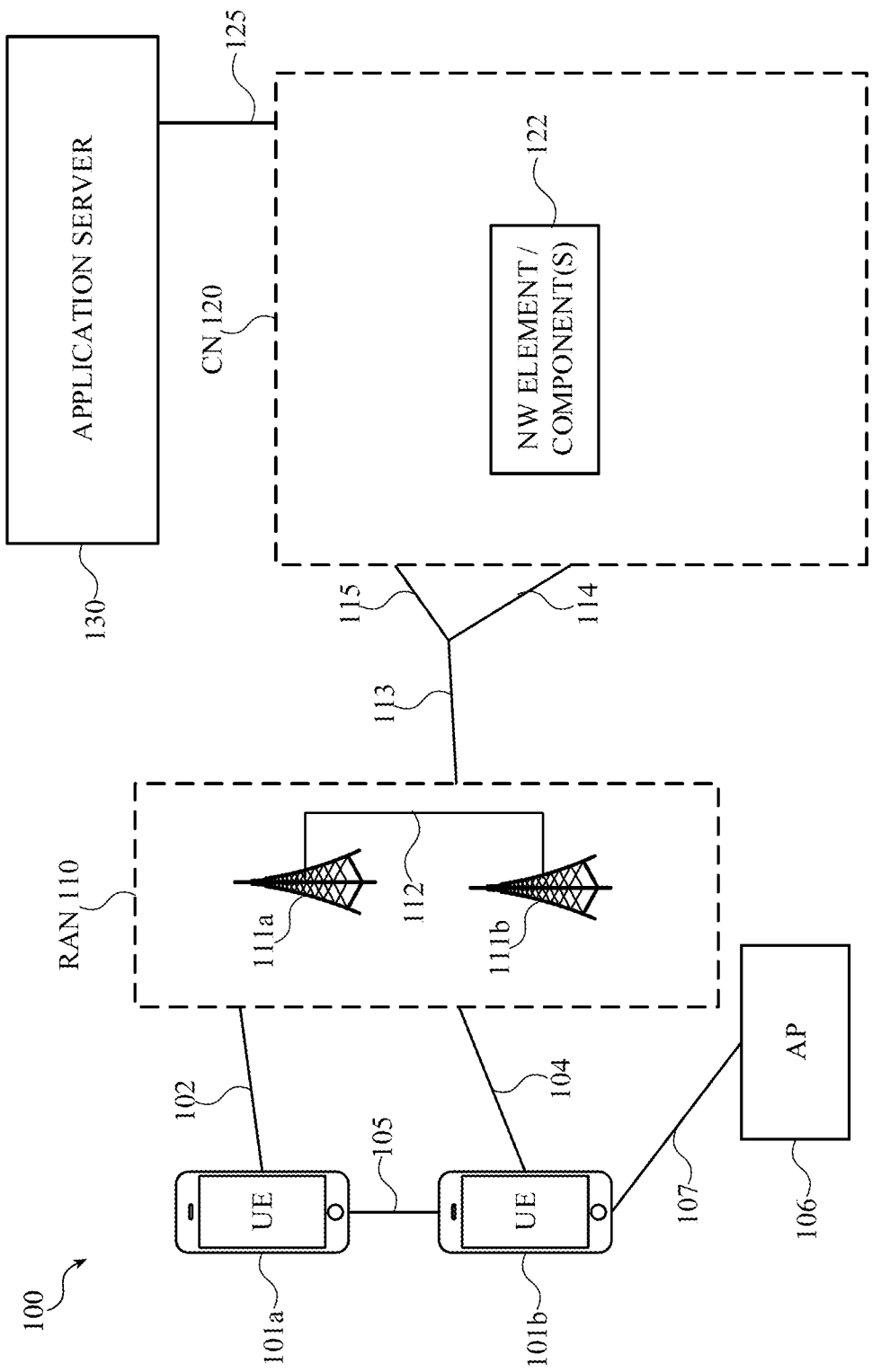
FIG. 1 illustrates an exemplary block diagram illustrating an example of user equipment(s) (UEs) communicatively coupled a network with network components as peer devices useable in connection with various embodiments (aspects) described herein.

Load balancing is achieved in new radio (NR) 5G networks with handover operations, redirection mechanisms upon radio resource control (RRC) signaling release and through the usage of inter-frequency and inter-radio access technology (RAT) priorities and offset parameters. However, signaling such as RRC signaling at the network layer includes a long handover latency, a long interruption time during the handover, and a heavy signaling overhead. Thus, handover mechanisms do not always satisfy the objectives for fast cell change with high frequencies in 5G networks. As such, there is a demand for enhancement on the signaling mechanisms for handover to improve handover latency and efficiency by increasing the usage of dynamic control signaling. In consideration of various concerns for enhancement on the signaling mechanisms for handover (HO) as well as for adding a primary cell of a secondary cell group (PSCell) to improve handover latency and efficiency by increasing the usage of dynamic control signaling, mechanisms for a channel state information reference signal (CSI-RS) based contention free random access (CFRA) procedure are disclosed. In current radio resource management (RRM), the HO mechanisms and PSCell addition are based on synchronization signal block (SSB) based random access channel (RACH) methods (e.g., SSB based contention based random access (CBRA) or SSB based contention free random access (CFRA)), while mechanisms for a CSI-RS based CFRA have not been considered. CBRA involves more signaling operations (e.g., a four step RACH signaling process) than CFRA (e.g., two step RACH signaling process), and thus, CFRA can allow decrease latency and greater efficiency for HO and PSCell addition.

Initial access can refer to the RACH process between the UE and base station (network) for the UE to acquire uplink synchronization and specified identification for radio access communication. The UE randomly selects and transmits a physical random access preamble, and to avoid collision with any other UE connected to the network, a PRACH collision can occur called "contention", which is the RACH process for initial access that allows this type of contention called a contention based RACH process. On the other hand, when the network allocates a physical random access preamble for use to the UE to preemptively avoid such collision, the RACH process for initial access is called a contention free RACH process. When CFRA is utilized, the UE can be configured with a set of candidate beams via an SSB or a CSI-RS and associated resources (e.g., a resource ID, a preamble ID, a RACH occasion (RO), etc.). If a CSI-Rs resource is not configured, the UE can select an index corresponding to an SSB in a candidate list, which can be quasi-co-located with a selected CSI-RS. By providing a CSI-RS resource set to the UE, the CSI-RS can be used for tracking at least one of a time or frequency as time/frequency (T/F) tracking. By utilizing the CSI-RS, the UE can perform T/F tracking more precisely.

In order to support CSI-RS based CFRA procedures in HO and PSCell addition, various aspects herein configure the timeline processes for such procedures. For example, to support HO to frequency range 1 (FR1) or the addition of an FR1 PSCell, aspects described herein relate to T/F tracking source selection, CSI-RS measurement(s) during the CSI- RS based CFRA procedure(s) to satisfy a reference signal receive power (RSRP) threshold, and the user equipment (UE) behavior when CSI-RS candidates do not satisfy the RSRP threshold, which are further detailed infra in reference to Figures (FIGs) 3 thru 10, for example.

In another example, to support HO to frequency range 2 (FR2) or the addition of an FR2 PSCell, aspects described herein relate to time and frequency (T/F) tracking source selection, transmit beam selection, and CSI-RS/SSB corresponded transmit beams; as well as the UE behavior if a beam correspondence (BC) function is not supported by the UE capability, which are further detailed infra in reference to FIG. 3 thru 10, for example.

In one example aspect, a network device such as a UE, a network component (e.g., a baseband processor), a base station (e.g., next generation NodeB (gNB)), or the like can perform a HO or PSCell addition with a CSI-RS CFRA procedure according to whether or not an associated synchronization signal block (SSB) to the CSI-RS is available. An associated SSB can be indicated by the network (e.g., gNB or higher layer signaling). The associated SSB can be configured with an index that corresponds to a CSI-RS resource of one or more CSI-RSs, and be signaled as a CSI-SSB indicating an association of an SSB to a CSI-RS (e.g., a quasi-co-located SSB with the CSI-RS), or similar signaling in a measurement configuration or other information element (IE), for example, to designate resources of the transmission occasion corresponding at least in part to a CSI-RS and an SSB.

In another example aspect, the network device can perform the HO or the PSCell addition with a CSI-RS based CFRA procedure according to an outcome of RSRP measurements satisfying an RSRP threshold or not. In situations where no CSI-RS based RSRP measurements satisfy the RSRP threshold, the device can process one or more UE behaviors by choosing a strongest CSI-RS candidate as the associated CSI-RS for CFRA, fallback to a contention based random access (CBRA) procedure, or continue to measure until a timer expires (e.g., a T304 timer).

In another aspect, the network device can perform the HO or the PSCell addition with a CSI-RS based CFRA procedure according to whether the HO or PSCell addition is to an FR1 target cell or FR1 PSCell.

In a further example aspect, the network device can perform the HO or the PSCell addition according to a UE capability for a UE. If the UE is capable of supporting beam correspondence (BC) function on a CSI-RS, on an SSB only, or both together, different beam selection operations can be configured by the UE or the network. For example, a UE can be configured to perform an HO or a PSCell addition based on a CSI-RS of a CFRA procedure. A determination can be made as to whether to perform a T/F tracking operation for a CSI-RS of the CFRA procedure based on at least one of: the CSI-RS, an associated synchronization signal block (SSB) to the CSI-RS, or a serving cell indication. Then a CFRA transmit timing can be determined based on the T/F tracking operation or a serving cell timing of a serving cell indicated by the serving cell indication. One or more RSRP measurements on the CSI-RS(s) can be performed for the CFRA procedure. In this manner and with the above considerations being determined/processed, the UE can perform the CSI-RS based CFRA for HO and adding a PSCell in an efficient way that improves signaling for CFRA and synchronizing the UE with a target cell or additional PSCell for radio resource management (RRM).

Additional aspects and details of the disclosure are further described below with reference to figures.

FIG. 1 illustrates example architecture of a system 100 of a network, in accordance with various embodiments (aspects). The following description is provided for an example system 100 that can be in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111, 112, or other network nodes) that can be connected via non-ideal backhaul, one providing NR access and the other one providing either E-UTRA for LTE or NR access for 5G, for example.

One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

In MR-DC, a group of serving cells associated with a master Node can be configured as a master cell group (MCG), comprising of a special cell (SpCell) as a primary cell (PCell) and optionally one or more secondary cells (SCells). An MCG can be the radio access node that provides the control plane connection to the core network (CN) 120; it may be a Master eNB (in EN-DC), a Master ng-eNB (in NGEN-DC) or a Master gNB (in NR-DC and NE-DC), for example. SpCell can either refer to the PCell of the MCG or the primary secondary cell (PSCell) of a second cell group (SCG) depending on if the MAC entity that is associated to the MCG or the SCG, respectively. An SpCell can refer to a PCell of MCG or an SCG. A SCG in MR-DC can be a group of serving cells associated with an SN, comprising of the SpCell as an PSCell and optionally one or more SCells.

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access AN nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 5G system 100 (e.g., next generation NodeB (gNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications.

In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. In some instances, the gNB-DUs, gNB-CUs, or other functions of the RAN node 111 may be co-located while in other instances are not co-located and/or operated by different entities. Additionally, or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal sub-carriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band").

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, 16).

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In aspects, the CN 120 can be a 5GC (referred to as "5GC 120" or the like), and the RAN 110 can be connected with the CN 120 via an NG interface 112. In embodiments, the NG interface 112 can be split into two parts, a Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs).

In aspects, where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Core NW elements/components 122 can include one or more of the following functions and network components: an Authentication Server Function (AUSF); an Access and Mobility Management Function (AMF); a Session Management Function (SMF); a Network Exposure Function (NEF); a Policy Control Function (PCF); a Network Repository Function (NRF); a Unified Data Management (UDM); an Application Function (AF); a User Plane (UP) Function (UPF); and a Network Slice Selection Function (NSSF).

The UPF, for example, can act as an anchor point for intra-RAT and inter-RAT mobility, an external Protocol Data Unit (PDU) session point of interconnect to Data Network (DN), and a branching point to support multi-homed PDU session. The UPF can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF can include an uplink classifier to support routing traffic flows to a data network. A DN can be various network operator services, Internet access, or third-party services, include, or be similar to, an application server. The UPF can interact with the SMF via an N4 reference point between the SMF and the UPF.

The AUSF, for example, can store data for authentication of UE 101 and handle authentication-related functionality. The AUSF can facilitate a common authentication framework for various access types. The AUSF can communicate with the AMF via an N12 reference point between the AMF and the AUSF; and can communicate with the UDM via an N13 reference point between the UDM and the AUSF. Additionally, the AUSF can exhibit an Nausf service-based interface.

The AMF, for example, can be responsible for registration management (e.g., for registering UE 101, etc.), connection management, reachability management, mobility management, and lawful interception of AMF-related events, and access authentication and authorization. The AMF can be a termination point for the N11 reference point between the AMF and the SMF. The AMF can provide transport for SM messages between the UE 101 and the SMF, and act as a transparent proxy for routing SM messages. AMF can also provide transport for SMS messages between UE 101 and a Short Message Service (SMS) Function (SMSF). AMF can act as Security Anchor Function (SEAF), which can include interaction with the AUSF and the UE 101 and/or receipt of an intermediate key that was established as a result of the UE 10 authentication process. Where Universal Subscriber Identity Module (USIM) based authentication is used, the AMF can retrieve the security material from the AUSF. AMF can also include a Single-Connection Mode (SCM) function, which receives a key from the SEA that it uses to derive access-network specific keys. Furthermore, AMF can be a termination point of a RAN Control Plane (CP) interface, which can include or be an N2 reference point between the (R)AN 110 and the AMF; and the AMF can be a termination point of Non Access Stratum (NAS) (N1) signaling, and perform NAS ciphering and integrity protection.

AMF can also support NAS signaling with a UE 101 over a non-3GPP (N3) Inter Working Function (IWF) interface. The N3IWF can be used to provide access to untrusted entities. N3IWF can be a termination point for the N2 interface between the (R)AN 110 and the AMF for the control plane, and can be a termination point for the N3 reference point between the (R)AN 101 and the UPF for the user plane. As such, the AMF can handle N2 signaling from the SMF and the AMF for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF via an N1 reference point between the UE 101 and the AMF, and relay uplink and downlink user-plane packets between the UE 101 and UPF. The N3IWF also provides mechanisms for IPsec tunnel establishment with the UE 101. The AMF can exhibit an Namf service-based interface, and can be a termination point for an N14 reference point between two AMFs and an N17 reference point between the AMF and a 5G Equipment Identity Register (5G-EIR) (not shown in FIG. 1).

The UE 101 can be registered with the AMF in order to receive network services. Registration Management (RM) is used to register or deregister the UE 101 with the network (e.g., AMF), and establish a UE context in the network (e.g., AMF). The UE 101 can operate in an RM-REGISTERED state or an RM-DEREGISTERED state. In the RM-DEREGISTERED state, the UE 101 is not registered with the network, and the UE context in AMF holds no valid location or routing information for the UE 101 so the UE 101 is not reachable by the AMF. In the RM-REGISTERED state, the UE 101 is registered with the network, and the UE context in AMF can hold a valid location or routing information for the UE 101 so the UE 101 is reachable by the AMF. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF can store one or more RM contexts for the UE 101, where each RM context is associated with a specific access to the network. The RM context can be a data structure, database object, etc. that indicates or stores, inter alia, a registration state per access type and the periodic update timer. The AMF can also store a 5GC Mobility Management (MM) context that can be the same or similar to an (Enhanced Packet System (EPS))MM ((E)MM) context. In various embodiments, the AMF can store a Coverage Enhancement (CE) mode B Restriction parameter of the UE 101 in an associated MM context or RM context. The AMF can also derive the value, when needed, from the UE's usage setting parameter already stored in the UE context (and/or MM/RM context).

Figure 2:
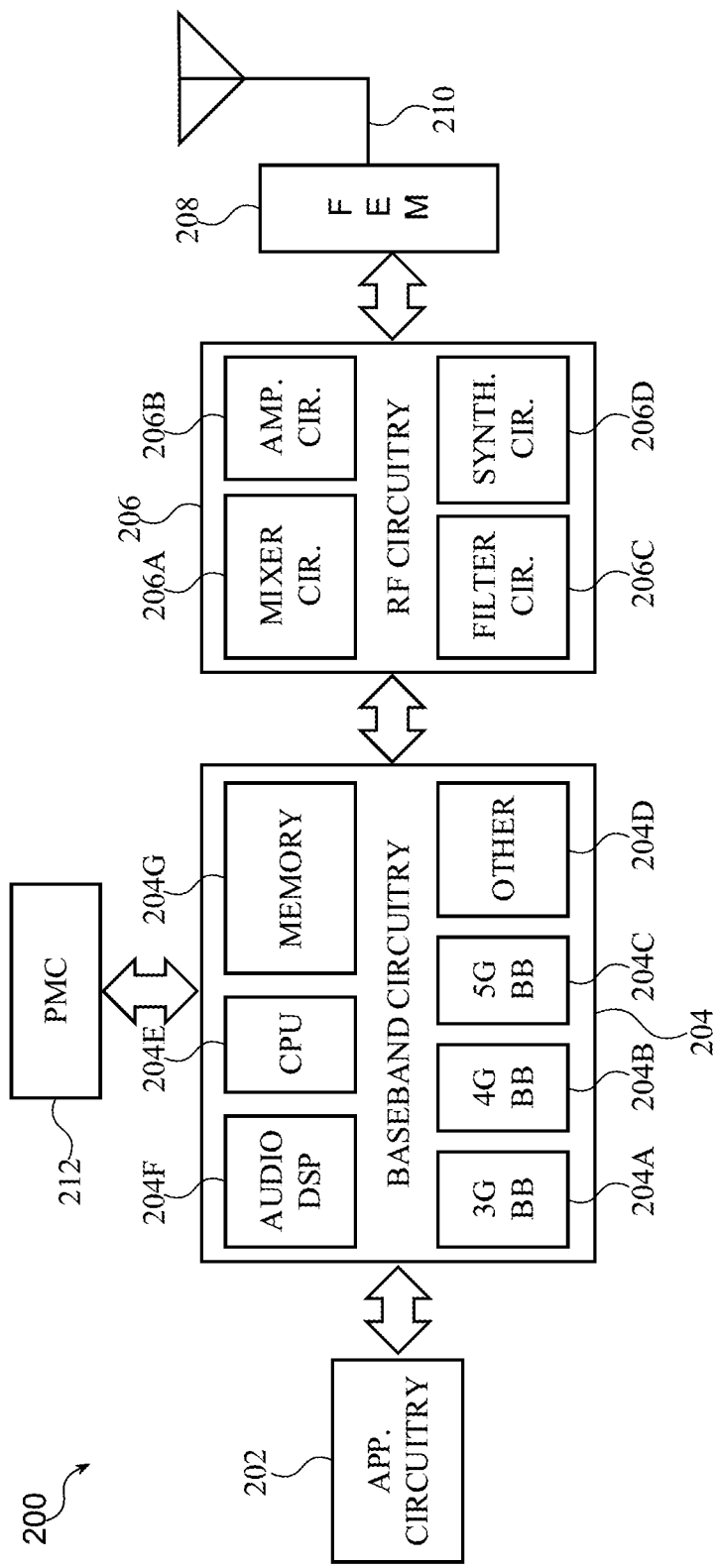
FIG. 2 illustrates a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node cannot utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. Memory 204G can include executable components or instructions to cause one or more processors (e.g., baseband circuitry 204) to perform aspects, processes or operations herein. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the application circuitry 202 depending on the desired output frequency. In some aspects, a divider control input (e.g., N) can be determined from a look-up table based on a channel indicated by the application circuitry 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM circuitry 208, or in both the RF circuitry 206 and the FEM circuitry 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM circuitry 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 cannot receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 202 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

Figure 3:
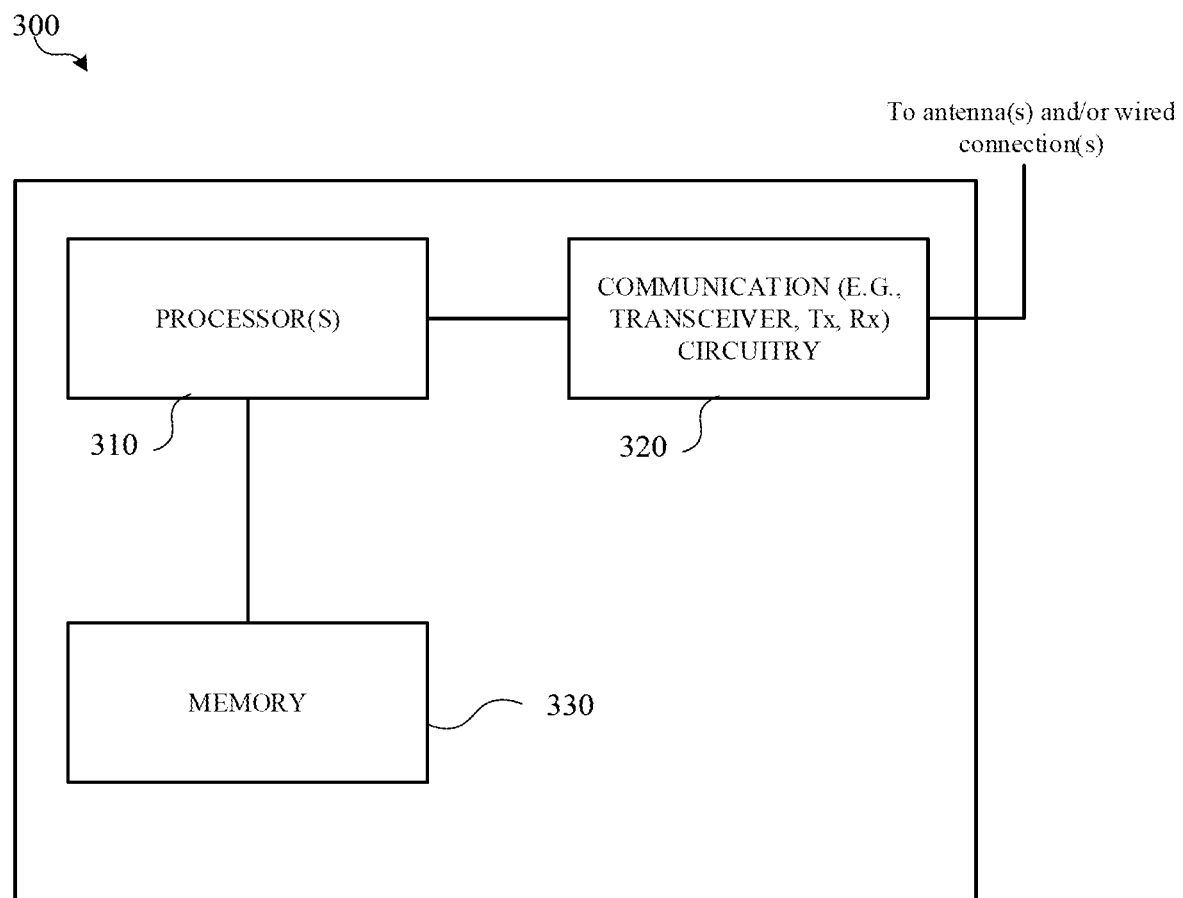
FIG. 3 illustrates an exemplary a simplified block diagram of a user equipment (UE) wireless communication device or other network device/component (e.g., eNB, gNB) in accordance with various aspects.

Referring to FIG. 3, illustrated is a block diagram of a user equipment (UE) device or other network device/component (e.g., gNB, eNB, or other participating network entity/component). The device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

Memory 330 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein, such as those described in reference to FIGS. 4-10, for example. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium.

In an aspect, the UE/gNB device 300 can operate to configure by processing/generating/encoding/decoding a physical layer transmission comprising multiple different transport blocks (TBs) based on an unequal protection between the different TBs in a physical layer encapsulation (e.g., EPC packets, a transmission opportunity, MCOT, a single transmission burst, a TTI or other encapsulation protocol or related encapsulation parameter(s) for the encapsulation of data from higher layers into frames for transmission over the air. The physical layer transmission can be received, transmitter, or provide(d) with communication/transmitter circuitry 320 to similarly process/generate the physical layer transmission with four or less spatial layers via a physical channel in an NR network.

Processor(s) 310 can be components of application circuitry or processor(s) of the baseband circuitry that can be used to execute elements of one or more instances of a protocol stack. For example, processor(s) 310 of baseband circuitry, alone or in combination, can be used to perform a HO or a PSCell addition based on a CSI-RS based contention free random access (CFRA) procedure. A CSI-RS rough timing of a CSI-RS position can be determined by the processor(s) 310 based on an associated SSB as an SSB associated with a CSI-RS or based on a serving cell indication. When an associated SSB is indicated by the network or gNB, the CSI-RS rough timing can be configured by processor(s) 310 based on the associated SSB, and be a function of an associated SSB timing, for example. Alternatively, or additionally, when an associated SSB is not indicated by the network or gNB, the CSI-RS rough timing can be based on a serving cell, either as an old serving cell in HO operation, or an existing serving cell in PSCell addition operations.

Then a CFRA transmit timing can be determined for transmission in the CFRA based on the CSI-RS rough timing, a CSI-RS fine timing, or both. derived from a T/F tracking operation on the CSI-RS and the CSI-RS rough timing. The CSI-RS rough timing can thus be a function of an associated SSB (when an associated SSB is indicated), or as a serving cell timing indicated by the network or derived from a current or source cell. The CSI-RS fine timing can be determined by processor(s) 310 as an additional operation to the CSI-RS for obtaining a more exact CSI-RS boundary in relation to the SSB or the serving cell timing through T/F tracking operations on the CSI-RS. Processor(s) 310 can further perform one or more reference signal receive power (RSRP) measurements on the CSI-RS for performing transmission in the CSI-RS based CFRA procedure.

Figure 4:
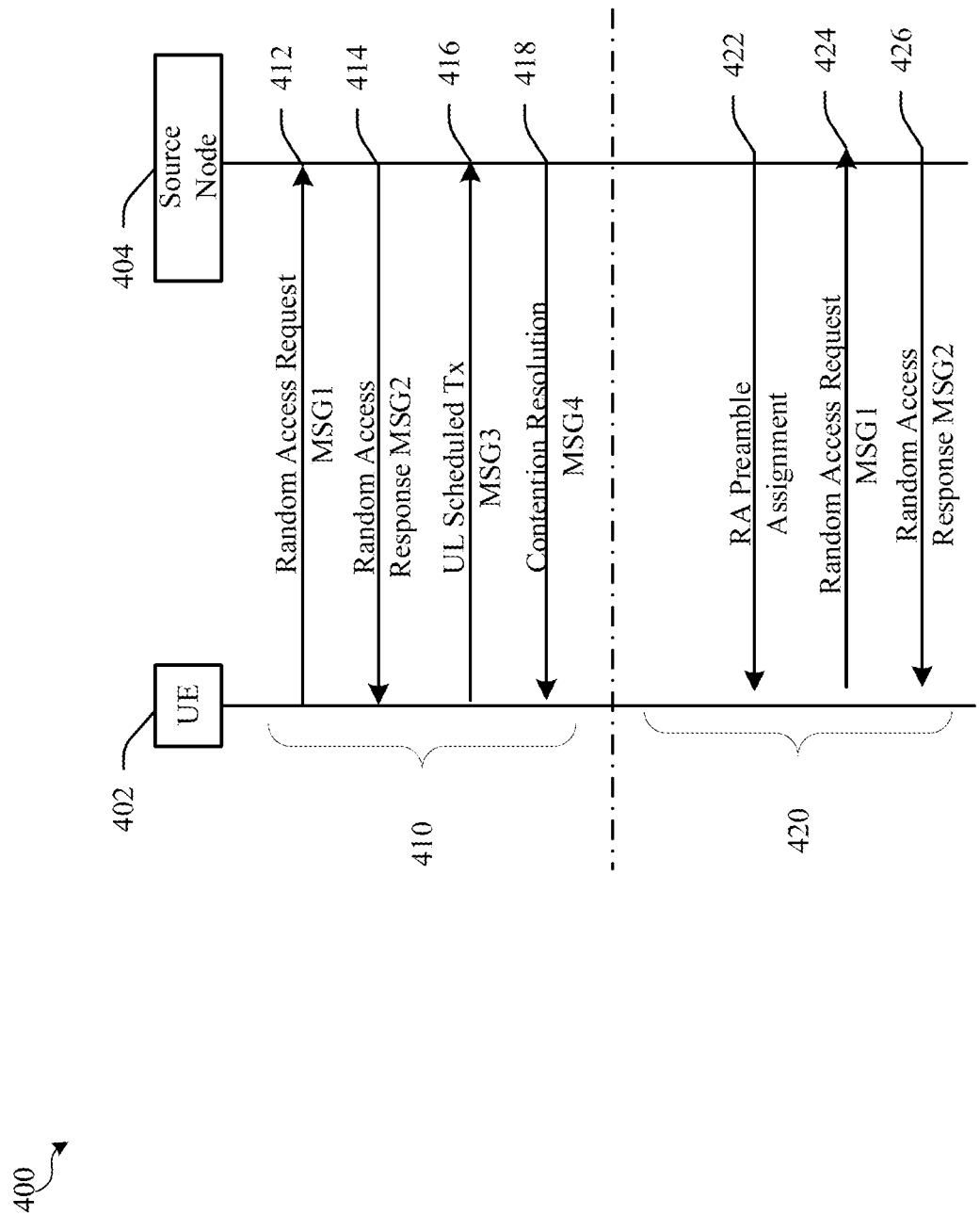
FIG. 4 illustrates example signal flows for a contention based random access (CBRA) procedure and a contention free random access (CFRA) procedure according to various aspects.

FIG. 4 illustrates examples of random access procedures 400 in accord with various aspects between a UE 402 and a source node 404. UE 402 and source node (e.g., gNB 404) can be communicatively coupled for wireless communication for facilitating HO to a target node or a PSCell addition to an existing serving cell. UE 402 can be an example of UE (e.g., 101, 300, or the like) comprising similar components. Likewise, source node 404 can be an example of a base station such as gNB 111a, 111b, 300, or the like) comprising similar components.

CBRA processes 410 and non-contention/contention free random access (CFRA) processes 420 can be different types of random access channel (RACH) procedures with different signaling processes as illustrated. CBRA processes 410 can include the UE 402 selecting a preamble randomly from a pool of preambles shared with other UEs. This means that the UE 402 has a potential risk of selecting the same preamble as another UE and subsequently could experience conflict or contention. The gNB 404 uses a contention resolution mechanism to handle this type of access requests. In the CBRA procedure, the result can be random and not all random access procedures succeed. Generally, the CBRA procedure 410 can be a four step process that includes a random access request 412 that includes a random access preamble transmission as message 1 (MSG1). A random access response (Msg2) 414 can be sent from the gNB 404. Upon receiving the preamble, the gNB 404 applies for a radio network temporary identifier (RNTI) (e.g., a temporary cell (TC) RNTI) and sends a random access response (Msg2) 414 with the random access (RA) preamble identifier, timing alignment information, initial uplink grant and the TC-RNTI. If the UE 402 receives a response containing an RA-preamble identifier which is the same as the identifier contained in the transmitted RA preamble, the response is successful. The UE then transmits uplink scheduling information with the UL scheduled transmission MSG3 416 via a physical channel (e.g., the physical uplink shared channel (PUSCH)). If the UE does not receive a response within a random access response window or fails to verify the response, the response fails. In CBRA, instead of CFRA, a handover is triggered if the UE accesses the target cell and dedicated preambles are not available during a handover. The gNB 404 assists the UE 402 with the Contention Resolution MSG4 418 by using a cell RNTI on the PDCCH or using a UE contention resolution identifier of an information element on the PDSCH.

In CFRA processes 420 a preamble is allocated by the gNB 404 and such preambles are known as a dedicated random access preamble. The dedicated preamble is provided to UE 402 either via RRC signaling (within an RRC message) or PHY Layer signaling (DCI on the PDCCH). Therefore, there is no preamble conflict. When dedicated resources are insufficient, the gNB 404 can instruct the UE 402 to initiate CBRA. CFRA is generally a three step RACH procedure include an RA preamble assignment 422, a random access request MSG1 424, and an RA response MSG2 426. The gNB 404 allocates an RA preamble to the UE 402 using RRC Msg or DCI. In random access response MSG2 426, the gNB 404 sends an RA response with timing alignment information and an initial UL grant.

If CFRA 420 is used, the UE 402 can be configured with a set of candidate beams via an SSB, a CSI-RS or both and their resources (e.g., Resource ID, Preamble ID, RACH occasion (RO), etc.). If at least one candidate beam's RSRP is above or satisfies a threshold (e.g., an rsrp-Threshold-SSB), the UE 402 selects an SSB or a CSI-RS. Then once a DL beam is identified, the preamble can be transmitted on the associated uplink beam and uses the RA preamble index corresponding to a selected SSB or CSI-RS. If the CSI-RS resources is not configured with a RA preamble index, the UE 402 can use an RA preamble index corresponding to an SSB in a candidate beam list that can be quasi-located (QCLed) with the selected CSI-RS.

For HO and PSCell addition, SSB-based CBRA and SSB-based CFRA consider various design configurations or parameters to take into account interruption time, which is the time between an end of a last time transmission interval (TTI) and the RRC command for HO or PSCell addition. In some instances, the interruption time should be less than a combined time parameter $T_{interrupt}$, which is a function of a search time ($T_{search}$) to get timing information of the target cell as well as a time for interruption uncertainty ($T_{iu}$) and a reference signal time ($T_{rs}$). $T_{iu}$ can represent an interruption uncertainty in acquiring a first available PRACH occasion (RO) in a new target cell. However, a time gap between the CSI-RS symbols and the RO can also be configured differently for CSI-RS based CFRA. Additionally, the $T_{rs}$ can represent the SSB-based RRM measurement timing configuration window (SMTC) periodicity of a target cell. Likewise, the time and frequency tracking for $T_{rs}$ can be configured differently for an associated CSI-RS, as well the beam information for FR2. Similarly, for PSCell addition components for the timeline or timing configuration such as Tpscell_DU for the delay uncertainty and $T_{rs}$ can be configured for the CSI-RS based CFRA.

Figure 5:
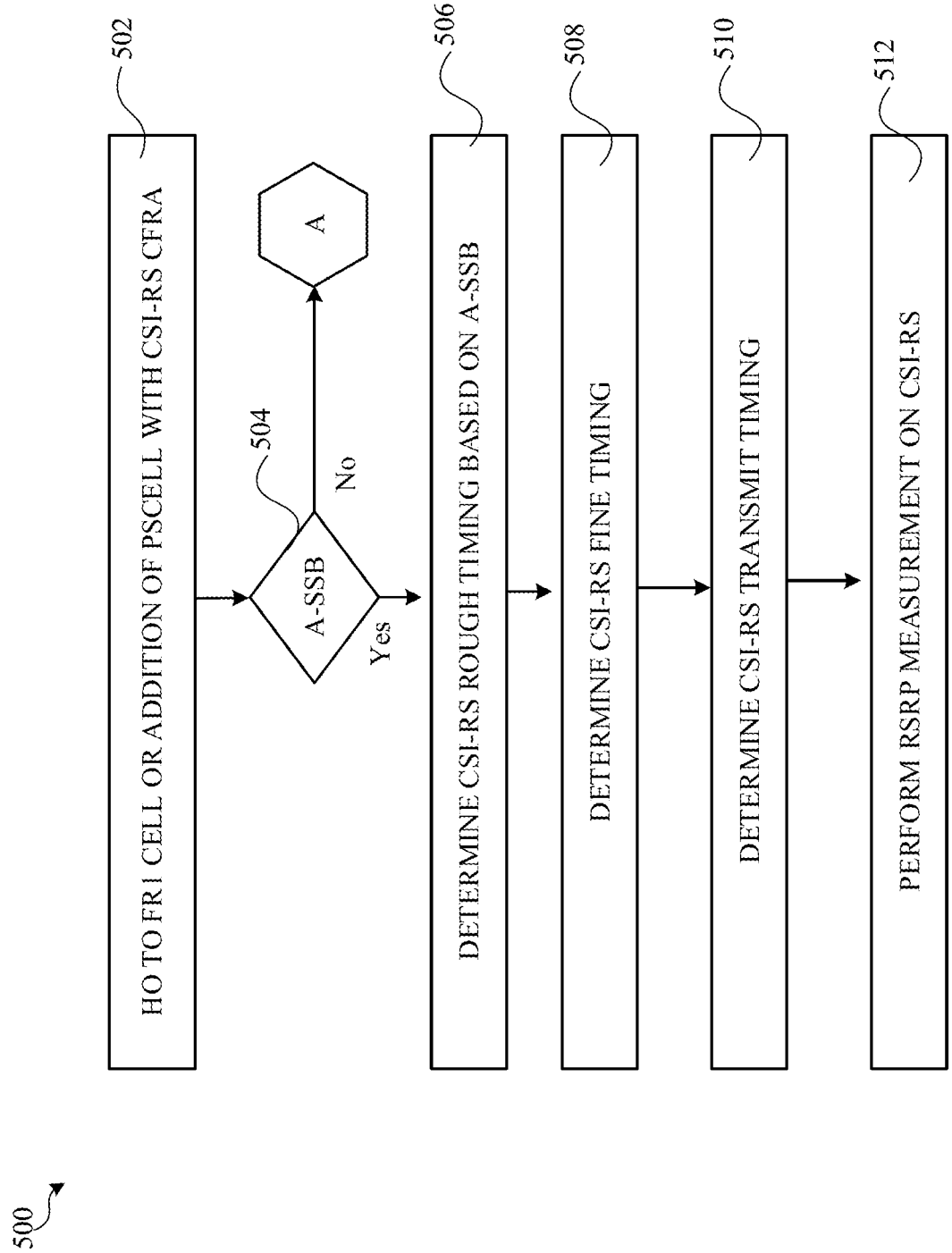
FIG. 5 illustrates an example process flow for handover (HO) or the addition of a primary cell of secondary cell group/primary second cell (PSCell) with a channel state information reference signal (CSI-RS) based CFRA procedure according to various aspects.

Referring to FIG. 5, illustrated is an example process flow 500 for performing HO to FR1 or adding an FR1 PSCell with CSI-RS based CFRA. The process flow 500 initiates at 502 by initiating a HO to an FR1 cell or an addition of an FR1 PSCell with CSI-RS based CFRA. Alternatively, or additionally, process flow 500 initiates at 502 by initiating a HO to an FR2 cell or an addition of an FR2 PSCell with CSI-RS based CFRA.

At 504, a determination is made whether the network or gNB 111 has provided an associated SSB that corresponds to a CSI-RS. The associated SSB can provide a timing or a beam resource of the CSI-RS for CFRA. If the determination is Yes, the process flow 500 proceeds to 506. If no, the process flow continues to process flow "A".

At 506, the UE 101 can determine a CSI-RS rough timing based on the associated SSB (A-SSB) that has been provided by the gNB 111. The CSI-RS rough timing can be derived by detecting a symbol boundary of the CSI-RS reference signal based on the associated SSB. This can be performed as a first T/F tracking operation on the SSB, for example. At 506, the UE 101 can detect the symbol boundary for the associated SSB. For example, the UE 101 determines where the first symbol boundary of the SSB is as it is received and processed. Then UE 101 further processes an indication of a symbol index or symbol identifier of the CSI-RS that can be received from the network. If this CSI-RS indication with the associated SSB is that the CSI-RS will be at the third symbol of the SSB, the UE 101 can derive a rough timing of the third symbol from the SSB downlink timing and this CSI-RS symbol indication. However, this position is not necessarily exact because the SSB does not represent the CSI-RS position in the time domain. Because the CSI-RS only roughly overlaps this indicated symbol of the SSB due to different propagation delays and multi-path effect, a CSI-RS rough timing only can be obtained of the CSI-RS symbol boundary and symbol location/position.

At 508, the process flow 500 continues with the UE 101 further determining a CSI-RS fine timing. Once the UE 101 determines the CSI-RS rough timing as a function of the associated SSB, the UE can facilitate a smaller search window for determining the exact symbol boundary and position/location. For example, based on the SSB symbol boundary determined by the CSI-RS rough timing processes of approximately where the CSI-RS may overlap with the SSB, the UE 101 can utilize a searching window to perform T/F tracking (e.g., a second T/F tracking operation) on the CSI-RS to obtain fine timing information of the exact symbol boundary and position/location of the CSI-RS. The UE 101 can utilize a plus/minus half cyclic prefix (CP) as a searching window, for example, where within this plus/minus half CP or other searching window the UE 101 can search for the exact CSI-RS symbol boundary on the CSI-RS. Because CSI-RS and the SSB may both have different multi-path conditions, the arrival time of these two different symbols at the UE side can vary. Thus, by utilizing the CSI-RS rough timing and a T/F tracking operation on the CSI-RS, a more precise CSI-RS symbol boundary and CSI-RS symbol location/position can be obtained as a CSI-RS fine timing.

At 510, the UE 101 determines the CSI-RS transmit timing based on the CSI-RS fine timing. For example, the CSI-RS transmit timing can be the CSI-RS timing minus a timing advance (TA) minus a TA offset, which can be represented as follows: CSI-RS timing−TA−TA_offset. The TA can be configured for scheduling UL along with the determined CSI-RS timing and a TA offset (TA_offset), which can be preconfigured by the network.

At 512, the UE 101 can perform RSRP measurements on the CSI-RS(s). If the CSI-RS satisfies an RSRP measurement threshold (e.g., rsrp-ThresholdCSI-RS), the CSI-RS is utilized for transmission in the CFRA procedure with the CSI-RS transmit timing in order to synchronize communication at a target cell or an additional PSCell. When the UE 101 is configured to perform the CSI-RS based CFRA, the network or gNB 111 can configure the RSRP measurement threshold to the UE 101 so the UE 101 can perform RSRP measurements of the CSI-RS candidates of the CSI-RS. If the UE 101 can determine that one of the CSI-RS candidates is above the RSRP measurement threshold indicated by the network/base station 111, the UE 101 uses the CSI-RS candidate to perform the CFRA RACH with the CSI-RS transmit timing for UL/DL synchronization with the target cell or added PSCell.

Those CSI-RSs above the threshold can be used to perform the CFRA operation, otherwise the UE 101 can configure another qualified CSI-RS or fall back to the CBRA according to other UE behavior aspects. Such UE behavior aspects can include the UE 101 selecting a strongest CSI-RS from among the plurality of CSI-RSs as the associated CSI-RS to perform the CFRA procedure. Alternatively, or additionally, the UE can fallback to performing CBRA based on an SSB. Alternatively, or additionally, the UE 101 can continue measuring CSI-RS candidates for performing CFRA until the expiration of a timer (e.g., T304 or another timer); if no CSI-RS can be determined to satisfy the RSRP threshold (e.g., rsrp-ThresholdCSI-RS) that is configured, the UE fails the HO or PSCell addition when the timer expires.

Figure 6:
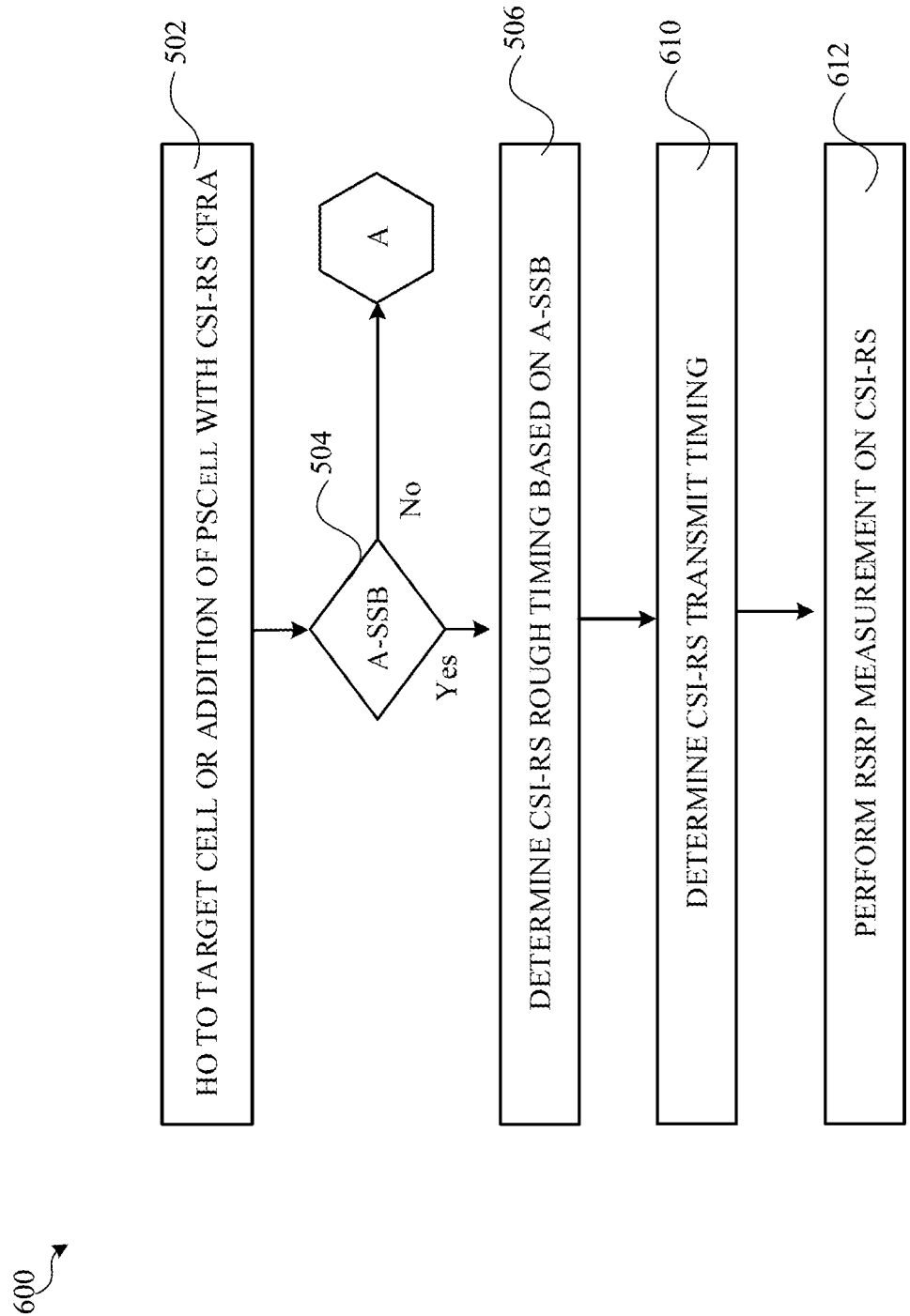
FIG. 6 illustrates another example process flow for HO or the addition of a PSCell with a CSI-RS based CFRA procedure according to various aspects.

Referring to FIG. 6, illustrated is another example a process flow 600 for performing HO to FR1 or adding an FR1 PSCell with CSI-RS based CFRA in accord with various aspects. Process flow 600 is similar to process flow 500 of FIG. 5. However, rather than determining the CSI-RS transmit timing based on the CSI-RS fine timing, the CSI-RS transmit timing can be determined based on the CSI-RS rough timing of an associated SSB that is provided by the network.

In an example, process flow 600 includes the process 502, decision 504, and process 506 of FIG. 5 to determine the CSI-RS rough timing based on an associated SSB that is provided by the network. Here, rather than performing T/F tracking operations more than once on the SSB and the CSI-Rs, or determining a CSI-RS rough timing and then fine tuning the exact location of the CSI-RS boundary based on the CSI-RS rough timing by T/F tracking on the CSI-RS, the CSI-RS rough tracking alone is performed. Therefore, at 610 the CSI-RS transmit timing can be determined by the associated SSB timing (as the CSI-RS timing in this case) minus a TA and a TA_offset, represented as follows: associated SSB timing−TA−TA_offset.

Depending on the UE capability or configuration of the UE 101, the UE 101 could determine which reference signal will be used for a final T/F tracking result, the CSI-RS fine timing (as configured at 508 of FIG. 5), or the CSI-RS rough timing. For example, even though the network (or gNB 111) provides the associated SSB to the CSI-RS, the UE 101 could still determine to perform T/F tracking of the CSI-RS for determining CSI-RS fine timing or not.

At 612, the UE 101 can perform RSRP measurements on the CSI-RS(s) to determine whether the CSI-RS(s) satisfies an RSRP measurement threshold (e.g., rsrp-ThresholdCSI-RS). If the CSI-RS satisfies the threshold, the CSI-Rs can be utilized for transmission in the CFRA procedure with the CSI-RS transmit timing in order to synchronize communication at a target cell or an additional PSCell. When UE 101 is configured to perform the CSI-RS based CFRA, the network or gNB 111 configures the RSRP measurement threshold to the UE 101 so the UE 101 can perform RSRP measurements of the CSI-RS candidates of the CSI-RS. If the UE 101 can determine that one of the CSI-RS candidates is above the RSRP measurement threshold provided by the network or base station 111, the UE 101 uses the CSI-RS candidate to perform the CFRA with the CSI-RS transmit timing as RACH procedure for UL/DL synchronization with the target cell or added PSCell.

Figure 7:
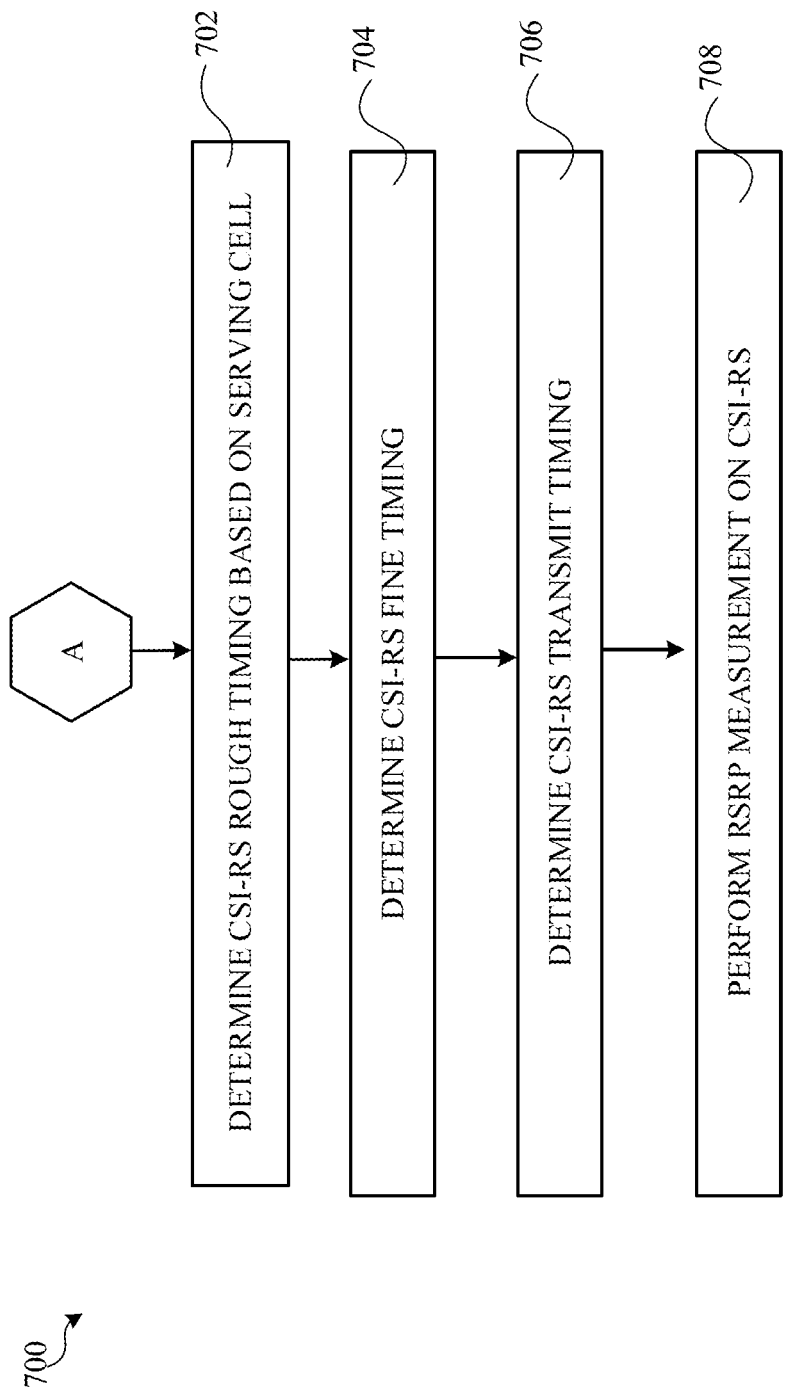
FIG. 7 illustrates another example process flow for HO or the addition of a PSCell with a CSI-RS based CFRA procedure according to various aspects.

Referring to FIG. 7, illustrated is a process flow 700 that flows from process flow 500 of FIG. 5 and process flow 600 of FIG. 6 in accord with various aspects. The process flow 700 flows from the decision 504 of FIG. 5 or 6 at reference "A", for example. In response to the decision at 504 being "No" at FIGS. 5 and 6, a determination is made that no associated SSB is available that corresponds to or is associated with the CSI-RS for CFRA.

The process flow 700 continues at 702 with the UE 101 determining a CSI-rough timing based on the serving cell. For example, a serving cell timing of a serving cell indicated by a serving cell indication from the network/gNB 111 can be used for either proceeding with a T/F tracking operation on the CSI-RS at 704, or alternatively only using the serving cell timing to derive the CFRA transmit timing.

Alternatively, or additionally, at 702 the UE can perform T/F tracking on an SSB that is QCLed with the CSI-RS for the CFRA. Then, the same beam can be used as the reference signal for the CSI-RS timing, and T/F tracking on the SSB QCLed with the CSI-RS can be performed as a part of or entirely for determining the CSI-RS rough timing with/without the serving cell timing. The UE 101 thus determines which SSB shares the same or similar beam as the CSI-RS. If the SSB has a similar or same spatial relation with the CSI-RS, then that SSB timing can be used for this CSI-RS timing and CFRA transmit timing would be based on this QCL SSB timing–TA–TA_offset. The type of QCLed SSB with the CSI-RS can be of any type (e.g., Type A, Type B, Type C or Type D). Thus, the CFRA transmit timing can be based on the timing of the SSB QCLed with the CSI-RS. For example, the CFRA transmit timing can be the QCLed SSB timing minus a TA minus a TA offset (e.g., QCLed SSB timing–TA–TA offset). The UE 101 would also perform RSRP measurement according to the RSRP threshold on this CSI-RS.

In an aspect, the process flow 700 can proceed at 704 with determining a CSI-RS fine timing based on at least one of: the CSI-RS rough timing or a T/F tracking operation on the CSI-RS. Here, a search window can be configured according to the CSI-RS rough timing based on the serving cell indicated to the UE 101. The serving cell can refer to an older/previous serving cell in HO operations or refer to an existing serving cell in PSCell addition operations. For example, UE 101 can facilitate a smaller search window for determining the exact symbol boundary and position/location. As with SSB, the timing can be different between the serving cell timing and the CSI-RS symbol boundary in the time domain. The UE 101, for example, can configure a searching window to perform T/F tracking on the CSI-RS to obtain fine timing information of the exact or more precise symbol boundary and position/location of the CSI-RS. For example, the UE 101 can utilize a plus/minus half cyclic prefix (CP) as a searching window where within this plus/minus half CP the UE 101 can search for the exact CSI-RS symbol boundary on the CSI-RS. Alternatively, or additionally, a different searching window can be configured by the UE 101 or indicated by the gNB 111 or higher layer signaling.

At 706, the UE 101 can determine the CSI-RS transmit timing based on the CSI-RS fine timing. For example, the CSI-RS transmit timing for CFRA can be determined based on the CSI-RS fine timing, a TA, and a TA offset. For example, the CSI-RS transmit timing can be represent as follows: CSI-RS fine timing–TA–TA_offset. The TA or TA offset (TA_offset) can be configured by the network.

At 708, the UE performs RSRP measurement(s) on the CSI-RS to determine whether the CSI-RS or one or more other CSI-RS(s) satisfy a threshold (e.g., rsrp-threshold for CSI-RS, rsrp-ThresholdCSI-RS, or the like).

Figure 8:
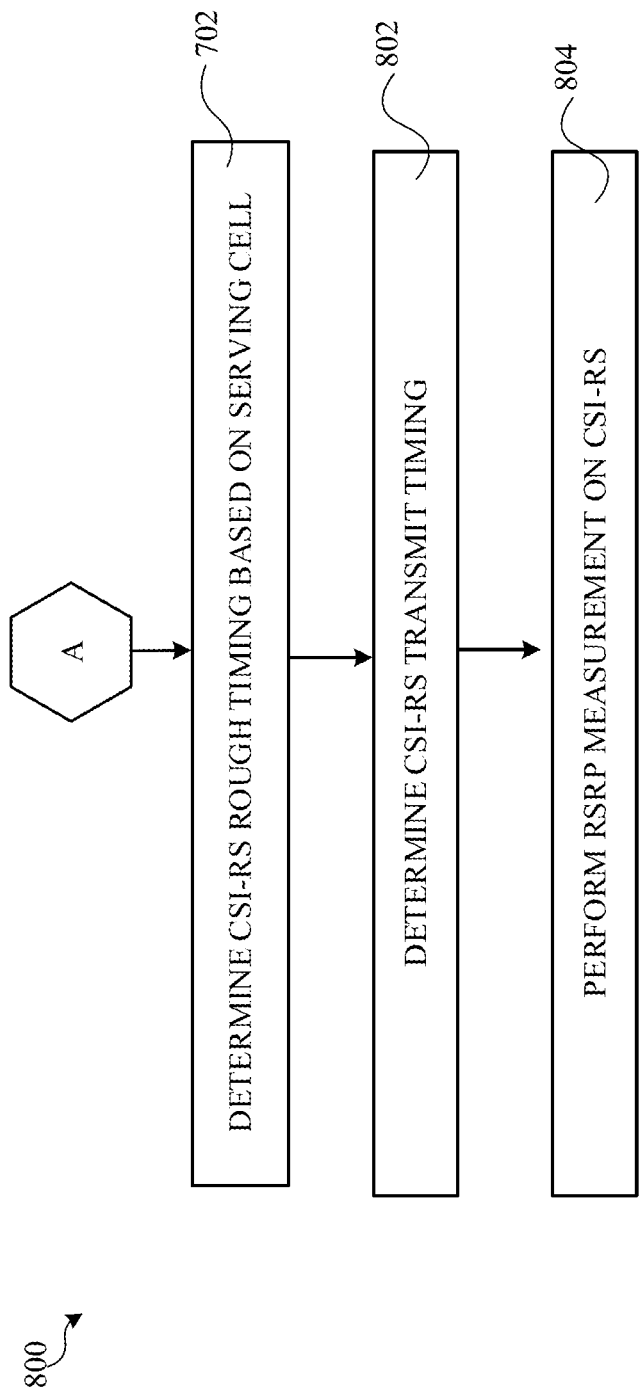
FIG. 8 illustrates another example process flow for HO or the addition of a PSCell with a CSI-RS based CFRA procedure according to various aspects.

Referring to FIG. 8, illustrated is another example of a process flow 800 that flows from process flow 500 of FIG. 5 and process flow 600 of FIG. 6 in accord with various aspects. The process flow 800 can also flow from the decision 504 of FIG. 5 or 6 at reference "A", for example. In response to the decision at 504 being "No" at FIGS. 5 and 6, a determination can be made that no associated SSB is available that corresponds to or is associated with the CSI-RS for CFRA.

The process flow 800 continues at 702 as in FIG. 7. Rather than determining a CSI-RS fine timing at 704 of FIG. 7, the process flow 800 of FIG. 8 continues at 802 with the UE 101 determining the CSI-RS transmit timing based on the CSI-RS rough timing. For example, at 802 the CSI-RS transmit timing for transmission with the CSI-RS for CFRA can be based on a serving cell timing of a serving cell indicated by the network gNB 111. The CSI-RS transmit timing, for example, can be the serving cell timing minus a TA and minus a TA offset as represented as follows: serving cell timing–TA–TA_offset.

As discussed above, alternatively, or additionally, at 702 the UE can perform T/F tracking on an SSB that is QCLed with the CSI-RS for the CFRA. Then, the same beam can be used as the reference signal for the CSI-RS timing, and T/F tracking on the SSB QCLed with the CSI-RS can be performed as a part of or entirely for determining the CSI-RS rough timing with/without the serving cell timing. The UE 101 thus determines which SSB shares the same or similar beam as the CSI-RS. If the SSB has a similar or same spatial relation with the CSI-RS, then that SSB timing can be used for this CSI-RS timing and CFRA Tx timing would be based on this QCL SSB timing–TA–TA_offset. The type of QCLed SSB with the CSI-RS can be of any type (e.g., Type A, Type B, Type C or Type D). Thus, the CFRA transmit timing can be based on the QCLed SSB timing. For example, the CFRA transmit timing can be QCLed SSB timing minus a TA minus a TA offset (e.g., QCLed SSB timing–TA–TA offset). The UE 101 would also perform RSRP measurement according to the RSRP threshold on this CSI-RS.

At 804, the UE 101 can perform RSRP measurement on the CSI-RS. The UE 101 can determine whether the CSI-RS or one or more other CSI-RS(s) satisfy a threshold (e.g., rsrp-threshold for CSI-RS, rsrp-ThresholdCSI-RS, or the like).

In various aspects where the UE 101 determines during the CFRA procedure that a CSI-RS does not meet or satisfy the RSRP threshold, the UE 101 can operate according to one or more different aspects. For example, the UE 101 can decide to utilize a strongest CSI-RS from among CSI-RSs to use as the associated CSI-RS for CFRA. Alternatively, or additionally, the UE 101 can configure a fallback operation to a CBRA based on an SSB from the network gNB 111. Alternatively, or additionally, the UE 1010 can continue to measure CSI-RS candidates for CFRA; if no CSI-RS is found to satisfy the RSRP threshold (e.g., rsrp-Threshold-CSI-RS), the UE 101 fails the HO or PSCell addition, either for FR1 or FR2, for example. The timer can be a T304 timer or other timer, for example, that can indicate an expiration for measuring CSI-RS candidates with respect to the RSRP threshold. The timer is used to indicate a HO failure (e.g., to an FR1 or FR2 target cell) or an addition of a PSCell (e.g., an FR1 or FR2 PSCell). During this T304 running it will keep measuring candidates for CSI-RS for CFRA. As long as the UE can find one CSI-RS to meet the threshold, then it will use it for the CFRA, otherwise the UE will wait until timer expires to trigger a HO failure.

Figure 9:
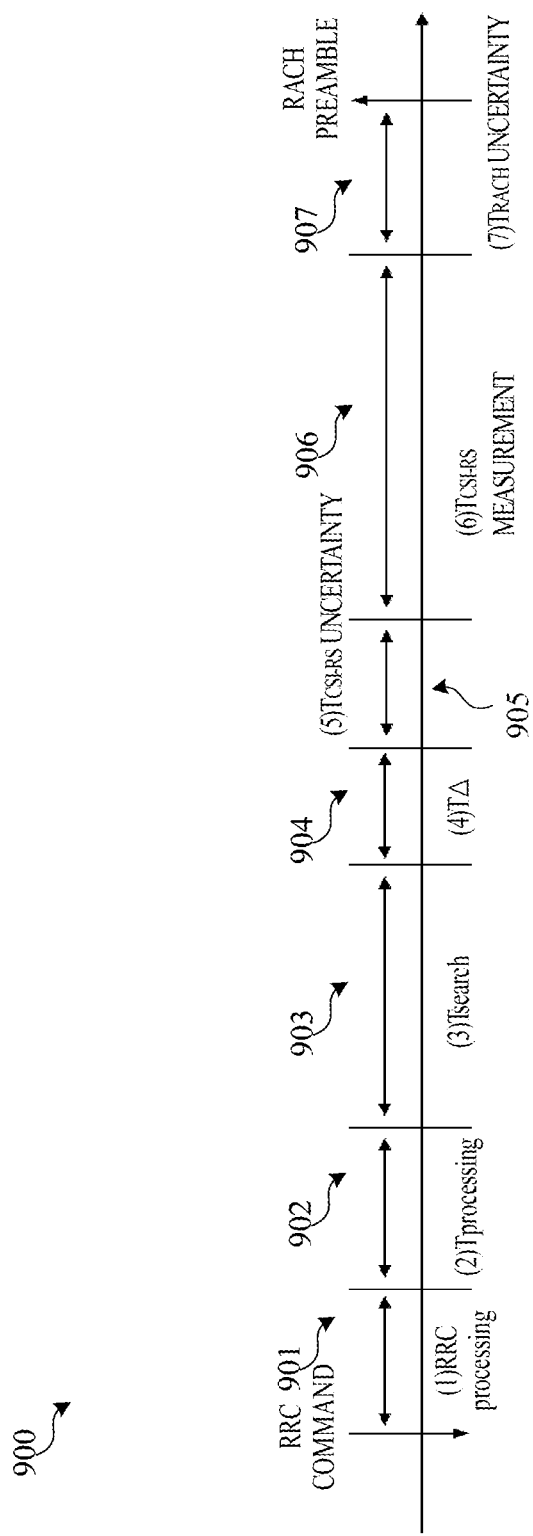
FIG. 9 illustrates an example timeline process for HO or the addition of a PSCell with a CSI-RS based CFRA procedure according to various aspects.

Referring to FIG. 9, illustrated is an example CSI-RS based CFRA procedure timeline 900 for HO to a FR1 or FR2, or an addition of an FR1/FR2 PSCell in accord with various aspects. At 901, UE 101 receives the RRC signaling and at 902 performs RRC processing to understand the RRC message for CFRA in a time domain. Then at 902, if the network signals the UE 101 to perform a HO or PSCell addition (as FR1 or FR2), then the UE 101 prepares for this HO or addition as a part of the Tprocessing.

Then at 903, the UE 1010 can perform a DL configuration on this target cell as a PCell or addition of a PSCell. However, at 903 if a serving cell timing is utilized for CSI-RS based CFRA as described in aspects/embodiments herein, 903 can be skipped or not performed. Here, for DL synchronization the UE 101 can receive the same timing from the existing serving cell as it is can already be known to the UE 101.

At 904, as Tdelta or TΔ, the UE 101 can perform T/F tracking on an SSB (e.g., an associated SSB to the CSI-RS for CFRA). However, at 904 if a serving cell timing is utilized for CSI-RS based CFRA as described in aspects/embodiments herein, this act 904 can also be skipped or not performed. The T search stage at 903 for the DL synchronization is a rough synchronization of the current cell, and thus, the UE 101 seeks to determine the fine timing of the SSB and needs to know the fine timing of the single boundary of the SSB, but this does not mean it is the fine timing for the CSI-RS. Therefore, on top of this SSB time tracking, the UE 101 can further determine the CSI-RS fine time tracking at 904.

At 905, the timeline 900 includes CSI-RS uncertainty time ($T_{CSI-RS}$ Uncertainty). After determining boundary information from the SSB, at the indicated symbol, the UE 101 receives the CSI-RS. This is the first uncertainty time that the UE receives the first CSI-RS after the previous action of receiving the SSB at 904 and processing the SSB (SSB in (4)/904 plus SSB processing time). If the serving cell timing is used in lieu of an associated SSB, then 905 can proceed after the T processing at 902; otherwise, the timeline proceeds after 904 with Tdelta or TΔ.

At 906 a $T_{CSI-RS}$ measurement is used for a measurement time period for the UE 101 to perform CSI-RS RSRP measurements and potentially also the CSI-RS T/F tracking. Here, the UE 101 checks whether the RSRP threshold of the CSI-RS can be met or satisfied.

At 907 a $T_{RACH}$ uncertainty delay period comprises a second RACH uncertainty. After the UE 101 determines a qualified CSI-RS satisfying the RSRP threshold, the UE 101 determines a corresponding RACH occasion (RO) to perform the preamble transmission in the CFRA. The delay uncertainty 907 derives from acquiring the first available PRACH occasion in the PCell or PSCell. The uncertainty 907 in this time period $T_{RACH}$ can be the summation of an associated a CSI-RS-to-PRACH occasion association period and RACH periodicity (e.g., 10 ms).

Figure 10:
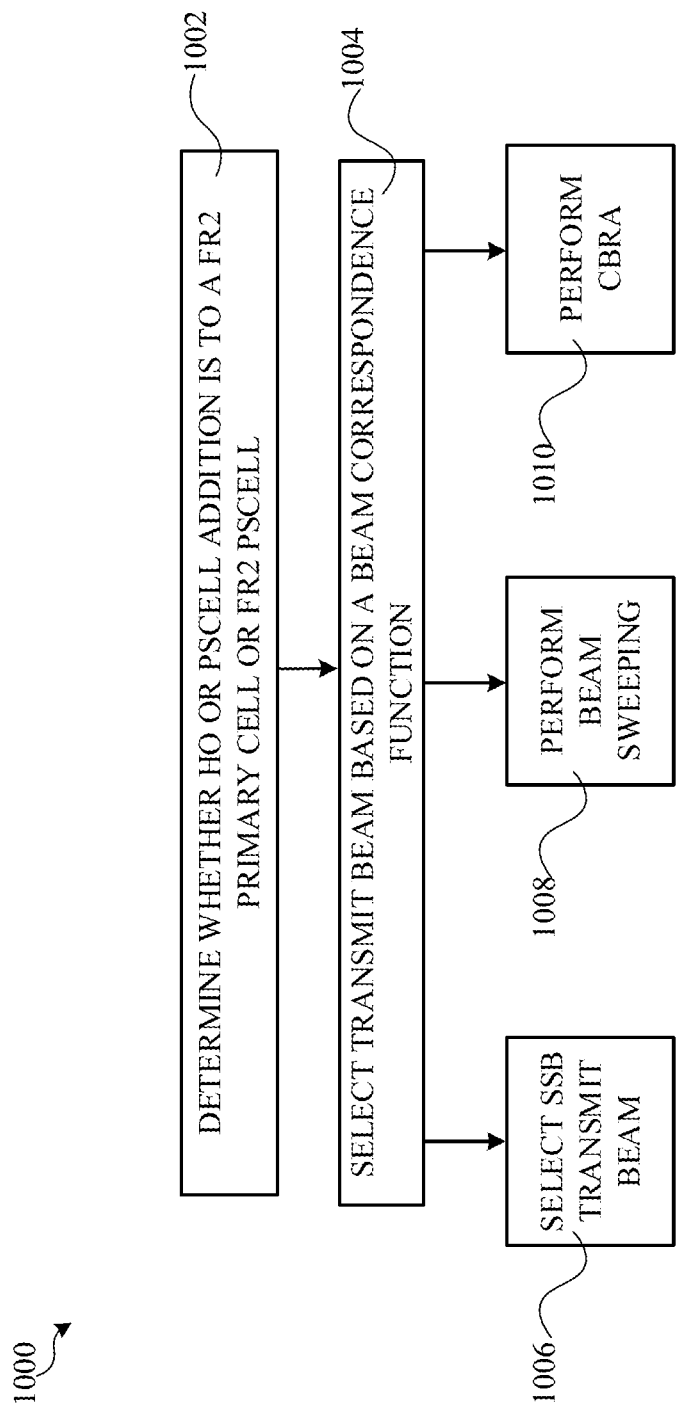
FIG. 10 illustrates an example process flow for frequency range 2 (FR2) HO or the addition of an FR2 PSCell with a CSI-RS based CFRA procedure with transmit beams selection according to various aspects.

Referring to FIG. 10, illustrated is an example of a process flow 1000 for beam selection as a part of HO to an FR2 cell or the addition of an FR2 PSCell with CSI-RS based CFRA in accord with various aspects. Process flow 1000 can enable beam selection for CFRA preamble transmission. The process flow 1000 initiates at 1002 with determining whether HO or PSCell addition is to a FR2 primary cell or an FR2 PSCell. At 1004, in response to the HO comprising an FR2 primary cell or the PSCell addition comprising an FR2 PSCell, the UE 101 can select a transmit beam to transmit a CFRA preamble based on a beam correspondence (BC) function that corresponds to the CSI-RS or based on another BC function that corresponds to the SSB, depending on the UE capability of UE 101.

In response to the UE capability of the UE 101 including the BC function corresponding to the SSB, but not the BC function corresponding to the CSI-RS, the UE 101 can operate at 1006 to select the transmit beam by using a transmit beam corresponding to an SSB receive beam of an SSB that is QCLed with the CSI-RS for the CFRA procedure. Alternatively, or additionally, the UE 101 can operate at 1008 to select the transmit beam by performing a transmit beam sweeping for the CFRA procedure. Alternatively, or additionally, the UE 101 can operate at 1010 to perform a CBRA procedure or an SSB based CFRA procedure instead of a CSI-RS based CFRA procedure.

In an aspect, in response to the UE capability not including the BC function on the CSI-RS (or corresponding to the CSI-RS) and does not include the BC function on the SSB (or corresponding to the CSI-RS), the UE 101 can select the transmit beam by performing a transmit beam sweeping for the CFRA procedure, as at 1008, or perform a CBRA procedure as at 1010. After, the UE 101 can transmit on the selected beam for CSI-RS based CFRA according to one or more various aspects as described herein.

Process flow 1000 or any aspects of process flow 1000 can be combined with acts, steps or aspects of other process flows as described herein for CSI-RS based CFRA.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is a baseband processor comprising: a memory, and processing circuitry configured to: determine a channel state information reference signal (CSI-RS) rough timing of a CSI-RS position based on a synchronization signal block (SSB) associated with a CSI-RS or based on a serving cell indication; determine a contention free random access (CFRA) transmit timing based on the CSI-RS rough timing; perform a reference signal receive power (RSRP) measurement on the CSI-RS for performing a CSI-RS based CFRA procedure; and perform a handover (HO) or a primary secondary cell (PSCell) addition based on the CSI-RS based CFRA procedure.

A second example can include the first example, wherein the processing circuitry is further configured to: determine the CFRA transmit timing based on a CSI-RS fine timing that is derived from a timing and frequency (T/F) tracking operation on the CSI-RS; perform the T/F tracking operation on the CSI-RS to determine the CSI-RS fine timing for the CSI-RS based CFRA procedure; and determine the CFRA transmit timing based on the CSI-RS fine timing, a timing advance (TA), and a TA offset.

A third example can include the first or second example, wherein the CFRA transmit timing is based on a TA, a TA offset, and the CSI-RS rough timing, wherein the CSI-RS rough timing is based on an associated SSB timing of the SSB associated with the CSI-RS or based on a serving cell timing of a serving cell indicated by the serving cell indication.

A fourth example can include any one or more of the first through third examples, baseband processor of claim 1, wherein the processing circuitry is further configured to: perform a downlink (DL) synchronization to a target cell of the HO or a PSCell of the PSCell addition; and perform a first T/F tracking operation on the SSB to determine an SSB fine timing of a symbol boundary of the SSB.

A fifth example can include any one or more of the first through fourth examples, wherein the processing circuitry is further configured to: receive the CSI-RS during a CSI-RS uncertainty period after receiving the SSB; perform at least one of: a T/F tracking operation on the CSI-RS or the RSRP measurement on the CSI-RS based on an RSRP threshold, during a CSI-RS measurement period; and acquire a first available physical random access channel (PRACH) occasion in the target cell or the PSCell during a random access channel (RACH) uncertainty period that comprises a CSI-RS-to-PRACH occasion association period and a RACH periodicity.

A sixth example can include any one or more of the first through fifth examples, wherein the processing circuitry is further configured to: in response to the CSI-RS or a CSI-RS candidate among a plurality of CSI-RS candidates not satisfying an RSRP threshold: transmit a CFRA transmission of the CSI-RS based CFRA procedure based on a CSI-RS candidate with a highest RSRP measurement among the plurality of CSI-RS candidates for the CFRA procedure; fallback to a contention based random access (CBRA) procedure based on the SSB or another SSB; or perform one or more additional RSRP measurements on the plurality of CSI-RS candidates for performing the CFRA procedure until an expiration of a timer.

A seventh example can include any one or more of the first through sixth examples, wherein the processing circuitry is further configured to: perform the HO to at least one of: a frequency range 1 (FR1) primary cell, a frequency range 2 (FR2) primary cell, or perform the PSCell addition by adding an FR1 PSCell or an FR2 PSCell; and in response to the HO comprising an FR2 primary cell or the PSCell addition comprising an FR2 PSCell, configuring a T/F tracking operation on the SSB or another SSB that is quasi co-located (QCLed) with the CSI-RS for the CFRA, wherein the CFRA transmit timing comprises a QCLed SSB timing minus a TA minus a TA offset.

An eighth example can include any one or more of the first through seventh examples, wherein the processing circuitry is further configured to: in response to the HO comprising an FR2 primary cell or the PSCell addition comprising an FR2 PSCell, selecting a transmit beam to transmit a CFRA preamble based on a beam correspondence (BC) function corresponding to the CSI-RS or based on another BC function corresponding to the SSB, depending on a UE capability.

A ninth example can include any one or more of the first through eighth examples, wherein the processing circuitry is further configured to: in response to the UE capability including the another BC function corresponding to the SSB and not the BC function corresponding to the CSI-RS: select the transmit beam by using a transmit beam corresponding to an SSB receive beam, wherein the SSB is QCLed with the CSI-RS for the CFRA procedure; select the transmit beam by performing a transmit beam sweeping for the CFRA procedure; or perform a CBRA procedure or an SSB based CFRA procedure instead of CSI-RS the CFRA procedure.

A tenth example can include any one or more of the first through ninth examples, wherein the processing circuitry is further configured to: in response to the UE capability not including the BC function and the another BC function: selecting the transmit beam by performing a transmit beam sweeping for the CFRA procedure; or performing a CBRA procedure.

An eleventh example is a user equipment (UE), comprising: a memory; and processing circuitry configured to: determine whether to perform a time and frequency (T/F) tracking operation for a channel state information reference signal (CSI-RS) of a contention free random access (CFRA) procedure based on at least one of: the CSI-RS, an associated synchronization signal block (SSB) to the CSI-RS, or a serving cell indication; determine a CFRA transmit timing based on the T/F tracking operation or a serving cell timing of a serving cell indicated by the serving cell indication; perform a reference signal receive power (RSRP) measurement on the CSI-RS for performing the CFRA procedure; and perform a handover (HO) or a primary secondary cell (PSCell) addition based on the CSI-RS of the CFRA procedure.

A twelfth example can include the eleventh example, wherein the processing circuitry is further configured to: in response to receiving the associated SSB to the CSI-RS for the CFRA procedure: determine a CSI-RS rough timing of a CSI-RS position based on the associated SSB; and determine a CSI-RS fine timing by performing the T/F tracking on the CSI-RS on a time domain and searching for a CSI-RS symbol boundary with a search window based on the CSI-RS rough timing.

A thirteenth example can include any one or more of the eleventh through the twelfth examples, wherein the processing circuitry is further configured to: determine the CFRA transmit timing based on the CSI-RS fine timing, wherein the CFRA transmit timing is based on the CSI-RS fine timing minus a timing advance (TA) minus a TA offset.

A fourteenth example can include any one or more of the eleventh through the thirteenth examples, wherein the processing circuitry is further configured to: determine the CFRA transmit timing based on an associated SSB timing of the associated SSB, wherein the CFRA transmit timing is based on the associated SSB timing minus a TA and minus a TA offset.

A fifteenth example can include any one or more of the eleventh through the fourteenth examples, wherein the processing circuitry is further configured to: in response to receiving a serving cell timing of a target cell, or not receiving the associated SSB: determine a CSI-RS rough timing of a CSI-RS position based on the serving cell timing; and determine a CSI-RS fine timing by performing the T/F tracking on the CSI-RS in a time domain and searching for a CSI-RS symbol boundary with a search window.

A sixteenth example can include any one or more of the eleventh through the fifteenth examples, wherein the processing circuitry is further configured to: perform the T/F tracking operation for the CSI-RS of the CFRA procedure based on the associated SSB to the CSI-RS of the CFRA procedure in response to the associated SSB being provided or based on the serving cell timing in response to the serving cell being indicated by the serving cell indication to determine a CSI-RS position in a time domain.

A seventeenth example can include any one or more of the eleventh through the sixteenth examples, wherein the processing circuitry is further configured to: in response to the CFRA transmit timing being based on the serving cell timing, configure the CFRA transmit timing to transmit a transmission of the CFRA procedure based on the serving cell timing minus a TA minus a TA offset.

An eighteenth example can include any one or more of the eleventh through the seventeenth examples, wherein the processing circuitry is further configured to: determine whether the RSRP measurement of the CSI-RS or a CSI-RS candidate satisfies an RSRP threshold; and determine the CFRA transmit timing based on a CSI-RS fine timing of the CSI-RS or of the CSI-RS candidate for a transmission of the CFRA procedure in response to the CSI-RS or the CSI-RS candidate satisfying the RSRP threshold.

A nineteenth example can include any one or more of the eleventh through the eighteenth examples, wherein the processing circuitry is further configured to: in response to the CSI-RS or a CSI-RS candidate among a plurality of CSI-RS candidates not satisfying an RSRP threshold: transmit a CFRA transmission on a strongest CSI-RS candidate among the plurality of CSI-RS candidates for the CFRA procedure; fallback to a contention based random access (CBRA) procedure based on the associated SSB or another SSB; or perform one or more additional RSRP measurements on the plurality of CSI-RS candidates for performing the CFRA procedure until an expiration of a timer.

A twentieth example can include any one or more of the eleventh through the nineteenth examples, wherein the processing circuitry is further configured to: perform the HO to at least one of: a frequency range 1 (FR1) primary cell, a frequency range 2 (FR2) primary cell, or perform the PSCell addition by adding an FR1 PSCell or an FR2 PSCell; and in response to the HO comprising an FR2 primary cell or the PSCell addition comprising an FR2 PSCell, configuring the T/F tracking operation on another SSB or the associated SSB that is quasi co-located (QCLed) with the CSI-RS for the CFRA, wherein the CFRA transmit timing comprises a QCLed SSB timing minus a TA minus a TA offset.

A twenty-first example can include any one or more of the eleventh through the twentieth examples, wherein the processing circuitry is further configured to: in response to the HO comprising an FR2 primary cell or the PSCell addition comprising an FR2 PSCell, selecting a transmit beam to transmit a CFRA preamble based on a beam correspondence (BC) function corresponding to the CSI-RS or another BC function corresponding to the associated SSB, depending on a UE capability of the UE.

A twenty-second example is a tangible computer readable storage device storing executable instructions that, in response to execution, cause one or more processors to be employed in a user equipment (UE) to perform operations, the operations comprising: determining a channel state information reference signal (CSI-RS) rough timing of a channel state information reference signal (CSI-RS)position based on a synchronization signal block (SSB) associated with a CSI-RS or a serving cell timing; determining a contention free random access (CFRA) transmit timing based on the CSI-RS rough timing; and performing a reference signal receive power (RSRP) measurement on the CSI-RS for performing a CSI-RS based CFRA procedure; and performing a handover (HO) or a primary secondary cell (PSCell) addition based on the CSI-RS based CFRA procedure.

A twenty-third example can include the twenty-second example, the operations further comprising: determining the CFRA transmit timing based on a CSI-RS fine timing that is derived from a timing and frequency (T/F) tracking operation on the CSI-RS; performing the T/F tracking operation on the CSI-RS to determine the CSI-RS fine timing for the CSI-RS based CFRA procedure; and determining the CFRA transmit timing based on the CSI-RS fine timing.

A twenty-fourth example can include any one of the twenty-second through twenty-third examples, wherein the CFRA transmit timing is based on the CSI-RS rough timing, and wherein the CSI-RS rough timing is based on an associated SSB timing of the SSB associated with the CSI-RS or based on the serving cell timing of a serving cell indicated by a serving cell indication from a network.

A twenty-fifth example can include any one of the twenty-second through twenty-fourth examples, the operations further comprising: determining whether the RSRP measurement of the CSI-RS satisfies an RSRP threshold; and determining the CFRA transmit timing based on a CSI-RS fine timing of the CSI-RS in response to the CSI-RS satisfying the RSRP threshold.

A thirtieth example can include an apparatus comprising means to perform one or more elements of a method described in or related to any of first thru twenty-first examples, or any other method or process described herein.

A twenty-sixth example can include one or more non-transitory computer-readable media comprising instructions to cause an electronic device, upon execution of the instructions by one or more processors of the electronic device, to perform one or more elements of a method described in or related to any one of the first thru twenty-first examples, or any other method or process described herein.

A twenty-seventh example can include an apparatus comprising logic, modules, or circuitry to perform one or more elements of a method described in or related to any one of the first thru twenty-first examples, or any other method or process described herein.

A twenty-eighth example can include a method, technique, or process as described in or related any one of the first thru twenty-first examples, or portions or parts thereof.

A twenty-ninth example can include an apparatus comprising: one or more processors and one or more computer-readable media comprising instructions that, when executed by the one or more processors, cause the one or more processors to perform the method, techniques, or process as described in or related to any one of the first thru twenty-first examples, or portions thereof.

A thirtieth example can include a signal as described in or related to any of examples 1-29, or portions or parts thereof.

A thirty-first example can include a datagram, packet, frame, segment, protocol data unit (PDU), or message as described in or related to any one of the first thru twenty-first examples, or portions or parts thereof, or otherwise described in the present disclosure.

A thirty-second example can include a signal encoded with data as described in or related to any one of the first thru twenty-first examples, or portions or parts thereof, or otherwise described in the present disclosure.

A thirty-third example can include a signal encoded with a datagram, packet, frame, segment, protocol data unit (PDU), or message as described in or related to any one of the first thru twenty-first examples, or portions or parts thereof, or otherwise described in the present disclosure.

A thirty-fifth example can include an electromagnetic signal carrying computer-readable instructions, wherein execution of the computer-readable instructions by one or more processors is to cause the one or more processors to perform the method, techniques, or process as described in or related to any one of the first thru twenty-first examples, or portions thereof.

A thirty-sixth example can include a computer program comprising instructions, wherein execution of the program by a processing element is to cause the processing element to carry out the method, techniques, or process as described in or related to any one of the first thru twenty-first examples, or portions thereof.

A thirty-seventh example can include a signal in a wireless network as shown and described herein.

A thirty-eighth example can include a method of communicating in a wireless network as shown and described herein.

A thirty-ninth example can include a system for providing wireless communication as shown and described herein.

A fortieth example can include a device for providing wireless communication as shown and described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor comprising:
a memory, and
processing circuitry configured to:
  determine a channel state information reference signal (CSI-RS) rough timing of a CSI-RS position based on an associated synchronization signal block (SSB) timing of an SSB associated with a CSI-RS or based on a serving cell timing of a serving cell indicated by a serving cell indication;
  determine a contention free random access (CFRA) transmit timing based on a timing advance (TA), a TA offset, and the CSI-RS rough timing;
  perform a reference signal receive power (RSRP) measurement on the CSI-RS for performing a CSI-RS based CFRA procedure; and
  perform a handover (HO) or a primary secondary cell (PSCell) addition based on the CSI-RS based CFRA procedure.

2. The baseband processor of claim 1, wherein the processing circuitry is further configured to:
  determine the CFRA transmit timing based on a CSI-RS fine timing that is derived from a timing and frequency (T/F) tracking operation on the CSI-RS;
  perform the T/F tracking operation on the CSI-RS to determine the CSI-RS fine timing for the CSI-RS based CFRA procedure; and
  determine the CFRA transmit timing based on the CSI-RS fine timing, a timing advance (TA), and a TA offset.

3. The baseband processor of claim 1, wherein the processing circuitry is further configured to:
  perform a downlink (DL) synchronization to a target cell of the HO or a PSCell of the PSCell addition; and
  perform a first T/F tracking operation on the SSB to determine an SSB fine timing of a symbol boundary of the SSB.

4. The baseband processor of claim 3, wherein the processing circuitry is further configured to:
  receive the CSI-RS during a CSI-RS uncertainty period after receiving the SSB;
  perform at least one of: a T/F tracking operation on the CSI-RS or the RSRP measurement on the CSI-RS based on an RSRP threshold, during a CSI-RS measurement period; and
  acquire a first available physical random access channel (PRACH) occasion in the target cell or the PSCell during a random access channel (RACH) uncertainty period that comprises a CSI-RS-to-PRACH occasion association period and a RACH periodicity.

5. The baseband processor of claim 1, wherein the processing circuitry is further configured to:
  perform the HO to a primary cell or perform the PSCell addition by adding a PSCell; and
  in response to the HO comprising an FR2 primary cell or the PSCell addition comprising an FR2 PSCell, configuring a T/F tracking operation on the SSB or another SSB that is quasi co-located (QCLed) with the CSI-RS for the CFRA, wherein the CFRA transmit timing comprises a QCLed SSB timing minus a TA minus a TA offset.

6. The baseband processor of claim 1, wherein the processing circuitry is further configured to:
  in response to the HO comprising an FR2 primary cell or the PSCell addition comprising an FR2 PSCell, selecting a transmit beam to transmit a CFRA preamble based on a beam correspondence (BC) function corresponding to the CSI-RS or based on another BC function corresponding to the SSB, depending on a UE capability.

7. The baseband processor of claim 6, wherein the processing circuitry is further configured to:
  in response to the UE capability including the another BC function corresponding to the SSB and not the BC function corresponding to the CSI-RS:
    select the transmit beam by using a transmit beam corresponding to an SSB receive beam, wherein the SSB is QCLed with the CSI-RS for the CFRA procedure;
    select the transmit beam by performing a transmit beam sweeping for the CFRA procedure; or
    perform a CBRA procedure or an SSB based CFRA procedure instead of CSI-RS the CFRA procedure.

8. The baseband processor of claim 6, wherein the processing circuitry is further configured to:
  in response to the UE capability not including the BC function and the another BC function:

selecting the transmit beam by performing a transmit beam sweeping for the CFRA procedure; or performing a CBRA procedure.

9. A user equipment (UE), comprising:
a memory; and
processing circuitry configured to:
  determine whether to perform a time and frequency (T/F) tracking operation for a channel state information reference signal (CSI-RS) of a contention free random access (CFRA) procedure based on at least one of: the CSI-RS, an associated synchronization signal block (SSB) to the CSI-RS, or a serving cell indication;
  in response to receiving the associated SSB to the CSI-RS for the CFRA procedure:
  determine a CSI-RS rough timing of a CSI-RS position based on the associated SSB;
  determine a CSI-RS fine timing by performing the T/F tracking on the CSI-RS on a time domain and searching for a CSI-RS symbol boundary with a search window based on the CSI-RS rough timing
  determine a CFRA transmit timing based on the CSI-RS fine timing, wherein the CFRA transmit timing is based on the CSI-RS fine timing minus a timing advance (TA) minus a TA offset;
  perform a reference signal receive power (RSRP) measurement on the CSI-RS for performing the CFRA procedure; and
  perform a handover (HO) or a primary secondary cell (PSCell) addition based on the CSI-RS of the CFRA procedure.

10. The UE of claim 9, wherein the processing circuitry is further configured to:
  perform the T/F tracking operation for the CSI-RS of the CFRA procedure based on the associated SSB to the CSI-RS of the CFRA procedure in response to the associated SSB being provided or based on a serving cell timing in response to a serving cell being indicated by the serving cell indication to determine a CSI-RS position in a time domain.

11. The UE of claim 9, wherein the processing circuitry is further configured to:
  determine whether the RSRP measurement of the CSI-RS or a CSI-RS candidate satisfies an RSRP threshold; and
  determine the CFRA transmit timing based on a CSI-RS fine timing of the CSI-RS or of the CSI-RS candidate for a transmission of the CFRA procedure in response to the CSI-RS or the CSI-RS candidate satisfying the RSRP threshold.

12. A user equipment (UE), comprising:
a memory; and
processing circuitry configured to:
  determine whether to perform a time and frequency (T/F) tracking operation for a channel state information reference signal (CSI-RS) of a contention free random access (CFRA) procedure based on at least one of: the CSI-RS, an associated synchronization signal block (SSB) to the CSI-RS, or a serving cell indication;
  in response to receiving a serving cell timing of a target cell, or not receiving the associated SSB:
  determine a CSI-RS rough timing of a CSI-RS position based on the serving cell timing;
  determine a CSI-RS fine timing by performing the T/F tracking on the CSI-RS in a time domain and searching for a CSI-RS symbol boundary with a search window;
  determine a CFRA transmit timing based on the CSI-RS fine timing;
  perform a reference signal receive power (RSRP) measurement on the CSI-RS for performing the CFRA procedure; and
  perform a handover (HO) or a primary secondary cell (PSCell) addition based on the CSI-RS of the CFRA procedure.

13. The UE of claim 12, wherein the processing circuitry is further configured to:
  in response to the CFRA transmit timing being based on the serving cell timing, configure the CFRA transmit timing to transmit a transmission of the CFRA procedure based on the serving cell timing minus a TA minus a TA offset.

14. The UE of claim 12, wherein the processing circuitry is further configured to:
  determine whether the RSRP measurement of the CSI-RS or a CSI-RS candidate satisfies an RSRP threshold; and
  determine the CFRA transmit timing based on the CSI-RS fine timing of the CSI-RS or of the CSI-RS candidate for a transmission of the CFRA procedure in response to the CSI-RS or the CSI-RS candidate satisfying the RSRP threshold.

\* \* \* \* \*